(12) United States Patent
Newman et al.

(10) Patent No.: US 8,097,377 B2
(45) Date of Patent: Jan. 17, 2012

(54) DEVELOPMENT OF HIGH ENERGY SURFACES ON STAINLESS STEELS FOR IMPROVED WETTABILITY

(75) Inventors: Keith E. Newman, Pittsford, NY (US); Mahmoud H. Abd Elhamid, Grosse Pointe Woods, MI (US); Charles H. Olk, Leonard, MI (US); Thomas A. Trabold, Pittsford, NY (US); Gayatri Vyas, Rochester Hills, MI (US)

(73) Assignee: GM Global Technology Operations LLC

( * ) Notice: Subject to any disclaimer, the term of this patent is extended or adjusted under 35 U.S.C. 154(b) by 1021 days.

(21) Appl. No.: 11/341,354

(22) Filed: Jan. 27, 2006

(65) Prior Publication Data
US 2007/0178356 A1 Aug. 2, 2007

(51) Int. Cl.
*H01M 8/04* (2006.01)
*H01M 8/24* (2006.01)
*H01M 2/38* (2006.01)
*H01M 2/40* (2006.01)
*B32B 15/00* (2006.01)
*B32B 15/01* (2006.01)
*B32B 15/20* (2006.01)
*F16C 33/12* (2006.01)

(52) U.S. Cl. ........ 429/457; 429/514; 428/641; 428/642; 428/677

(58) Field of Classification Search .............. 429/12–46, 429/129
See application file for complete search history.

(56) References Cited

U.S. PATENT DOCUMENTS

| 3,663,215 | A | * | 5/1972 | Tanczyn | 420/50 |
|---|---|---|---|---|---|
| 4,039,356 | A | * | 8/1977 | Schumacher et al. | 428/450 |
| 4,279,648 | A | * | 7/1981 | Ito et al. | 420/44 |
| 4,653,684 | A | * | 3/1987 | Saito et al. | 228/262.41 |
| 5,565,167 | A | * | 10/1996 | Fujimoto et al. | 420/50 |
| 5,942,347 | A | * | 8/1999 | Koncar et al. | 429/30 |
| 2004/0224212 | A1* | | 11/2004 | Wakahoi et al. | 429/35 |
| 2005/0109434 | A1* | | 5/2005 | Seung et al. | 148/561 |
| 2005/0164070 | A1* | | 7/2005 | Krajewski et al. | 429/38 |
| 2006/0194095 | A1* | | 8/2006 | Vyas et al. | 429/38 |

FOREIGN PATENT DOCUMENTS

JP  2001207243 A * 7/2001
JP  2004124197 A * 4/2004

OTHER PUBLICATIONS

Machine translation of JP2001-207243 (Apr. 2004).*
Machine translation of JP2004-124197 (Jul. 2001).*
Definition of silicon oxide, silicon oxide. (n.d.). WordNet® 3.0. Retrieved Jan. 27, 2010, from Dictionary.com website: http://dictionary.reference.com/browse/silicon oxide.*

* cited by examiner

*Primary Examiner* — Basia Ridley
*Assistant Examiner* — Sean P Cullen
(74) *Attorney, Agent, or Firm* — Harness, Dickey & Pierce, P.L.C.

(57) ABSTRACT

A bi-polar plate is provided for a fuel cell stack. The bi-polar plate has improved surface wettability. The bi-polar plate includes a body including at least approximately ninety percent by weight of a metal and defining at least one flow channel. At least about 0.05 percent and up to 100 percent by weight of silicon is disposed on a surface of the at least one flow channel to form a high energy surface to form a high energy surface for the bi-polar plate. This can be achieved by adding from 0.5 to 10 weight % silicon to the steel. The percent of silicon is pre-determined based on a desired wettability of the high energy surface of the at least one flow channel.

9 Claims, 2 Drawing Sheets

DEVELOPMENT OF HIGH ENERGY SURFACES ON STAINLESS STEELS FOR IMPROVED WETTABILITY

FIELD OF THE INVENTION

The present invention relates to fuel cell systems, and more particularly, to a development of high energy surfaces on stainless steels to improve wettability.

BACKGROUND OF THE INVENTION

Electrochemical cells, such as fuel cells, generate electrical power through the electrochemical reaction of a fuel and an oxidant. An exemplary fuel cell has a membrane electrode assembly (MEA) with catalytic electrodes and a proton exchange membrane (PEM) sandwiched between the electrodes. In PEM type fuel cells, hydrogen can be supplied as a reductant to an anode and oxygen can be supplied as an oxidant to a cathode. PEM fuel cells reduce oxygen at the cathodes and generate an energy supply for various applications, including vehicles.

It is well established that channel water accumulation, in both the anode and cathode flow field plates, significantly influences fuel cell performance at low loads. When the gas velocities are relatively low (i.e., less than about 5 meters per second), the water transported through diffusion media favors the formation of liquid droplets that occupy a significant portion of the channel cross-section. These droplets increase the gas flow resistance in particular channels, thereby diverting flow to neighboring channels and essentially starving the local active area of necessary reactants. Various means of circumventing this potential problem have been explored and have included altering the physical characteristics of the channels, including the channel geometry, specifically the size and shape. There remains a need for improved water management to improve fuel cell performance, efficiency, and lifespan.

SUMMARY OF THE INVENTION

The present invention provides a bi-polar plate for a fuel cell stack. The bi-polar plate has improved surface wettability. The bi-polar plate includes a body comprising at least approximately 90 percent by weight of a metal and defining at least one flow channel. At least about 0.05 percent and up to 6 percent by weight of the bi-polar plate material is silicon which will enrich the passive film on the metallic bi-polar plates with silicon dioxide. The latter creates a high energy surface for the bi-polar plate. The presence of silicon is predetermined based on a desired wettability of the high energy surface of the at least one flow channel.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE VARIOUS EMBODIMENTS

The following description of various embodiments is merely exemplary in nature and is in no way intended to limit the invention, its application, or uses. Although the following exemplary description refers to the development of a high energy surface material with improved wettability for a fuel cell system in a vehicle, it will be understood that the present invention may be applicable to other systems/components and may be appropriate for use in a variety of different mechanisms. In addition, the foregoing description details the use of silicon to increase the surface energy of a metallic material, however, it will be understood that any suitable additive could be used to increase the surface energy of the metallic material. It will be further understood that while the following description will relate to the use of a hydrogen feed gas for a fuel cell system, it should be noted that numerous other fuels could be employed, and further, the foregoing description is understood to not limit the appended claims.

Figure 1:
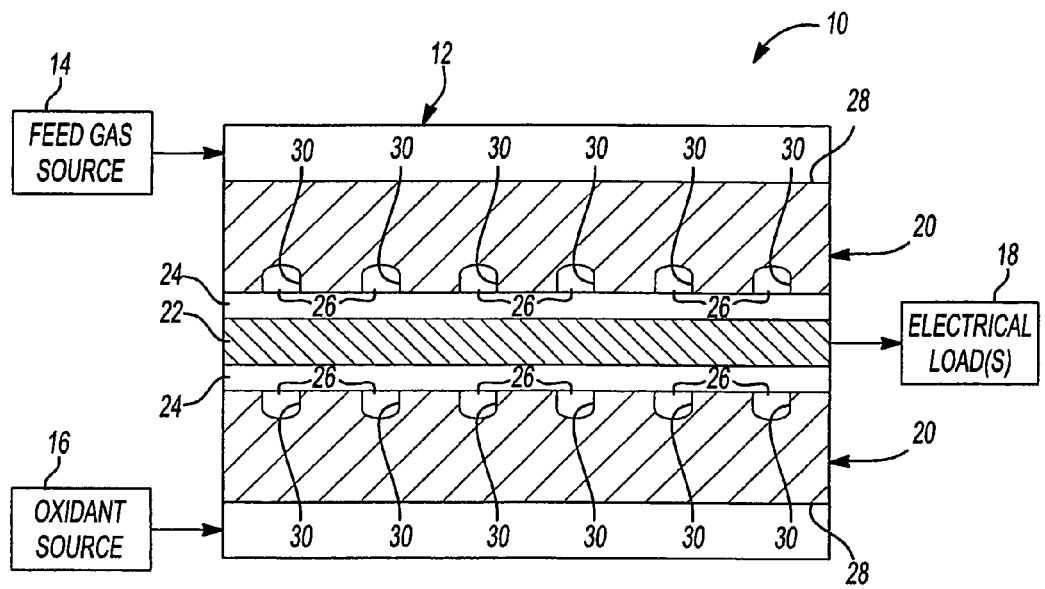
FIG. 1 is a schematic view of a fuel cell stack including bi-polar plates formed of a material with improved wettability according to various embodiments of the present invention.

Referring now to FIG. 1, a fuel cell system 10 is shown. The fuel cell system 10 includes a fuel cell stack 12 coupled to a feed gas source unit 14 and an oxygen source unit 16. The fuel cell stack 12 produces electrical power to power at least one electrical load 18. The electrical load(s) 18 can include an electric motor, lights, heaters or any other type of electrically powered components.

Figure 2:
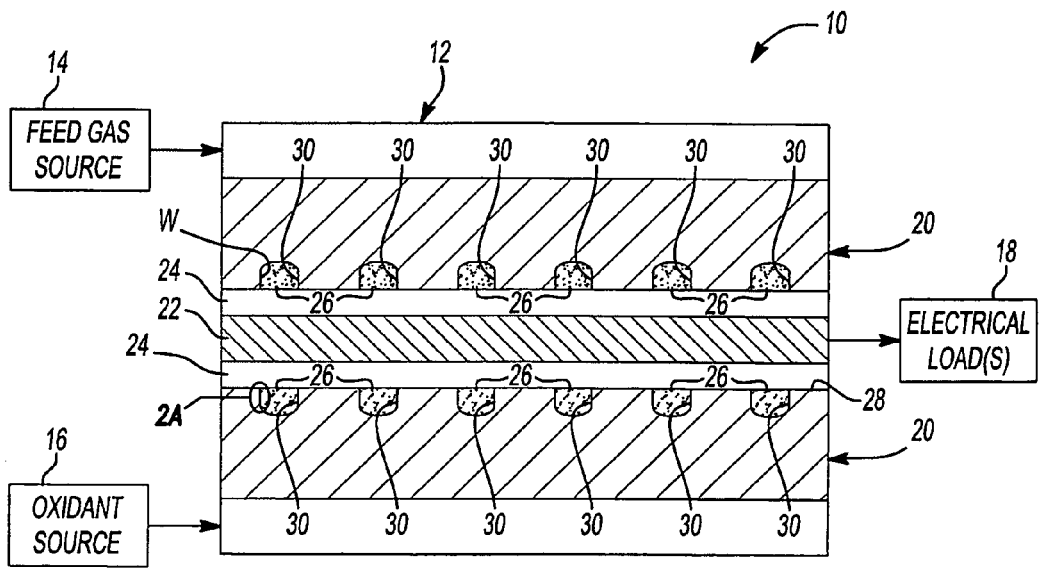
FIG. 2 is a detailed schematic view of the bi-polar plate of FIG. 1.

With continuing reference to FIG. 1 and additional reference to FIG. 2, the fuel cell stack 12 includes a pair of bi-polar plates 20 each disposed opposite a membrane electrode assembly 22 and separated from the membrane electrode assembly (MEA) 22 by a gas diffusion layer 24. The bi-polar plates 20 each generally include a plurality of flow channels 26 defined within a surface 28 of the bi-polar plates 20 to enable the feed gas and oxidant gas to flow to the MEA 22 to react to produce electrical power.

Figure 2A:
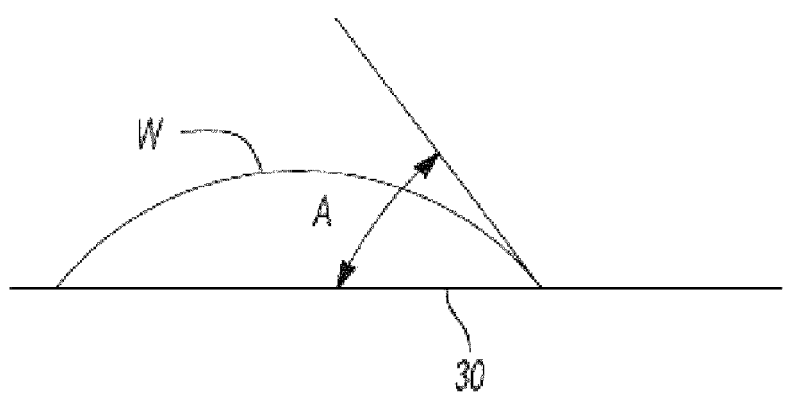
FIG. 2A is a detailed view of the water contact angle of FIG. 2.

During the reaction of the feed gas and oxidant gas, water is produced. The water droplets W may form on surfaces 30 of the flow channels 26 and thus restrict the flow of the feed gas and oxidant gas through the flow channels 26 as best shown in FIG. 2. To mitigate the problem, the wettability of the surface 30 may be increased such that the water droplets will wet the surface 30 of the flow channels 26 and thus form a film on the surfaces 30. Generally, improved performance of the flow of the feed gas and oxidant gas may be achieved if a contact angle A of the water droplet on the surface 30 is below 40 degrees, and more desirably if the contact angle A is below 20 degrees, as shown in FIG. 2A.

With continuing reference to FIGS. 1, 2, 2A, and 3, in order to reduce the wettability of the surfaces 30, the bi-polar plates 20 may be comprised of a metallic material M including a desired percentage by weight of silicon Si. The metallic material M may be any material which can withstand the operating conditions of the fuel cell stack 12, such as titanium, stainless steel, nickel base alloys, graphite, and other metallic alloys. The addition of the silicon Si to the metallic material M increases the surface energy of the surfaces 30 of the bi-polar plates 20 through the formation of a silicon-rich surface oxide. Alternatively, titanium may be added to the desired metallic material M and/or along with silicon Si to assist in the formation of a high energy surface on the surfaces 30. The titanium can be between 0.01 and 3 percent by weight of the bi-polar plate material. For example, 1.5 percent to 6 percent of titanium and silicon could be added to a stainless steel material to assist in the formation of a high energy surface on the surface 30. The increased surface energy of the surface 30 causes the water droplets to wet the surface 30.

Generally, the amount of silicon Si added to the metallic material M may range from about 0.5 percent to 10 percent by weight, but could range from about 1.5 percent to 6 percent by weight, depending on the desired metallic material M. It is desired that the surface has up to 100 percent silicon disposed thereon in order to achieve lower water contact angle values. If stainless steel is the desired metallic material M, the amount of silicon Si in the stainless steel may range from 4 percent to 6 percent and in another embodiment from 3 percent to 4 percent, and is preferably 1.5 percent to 3 percent by weight.

Figure 3:
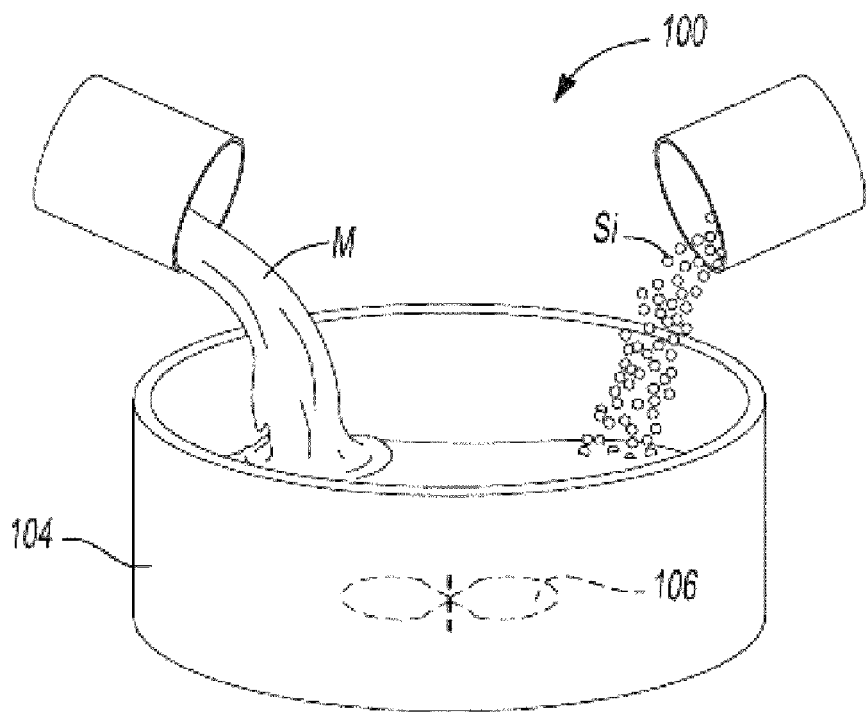
FIG. 3 is a perspective view of one method for forming the high energy surfaces of the present invention.

With reference now to FIG. 3, a natural melt process 100 may be used to form the silicon rich layer for the surface 30 (not specifically shown). In the natural melt process 100, liquid metallic material M is added to a heat resistant container 104 along with crystalline silicon Si. A stirring device 106 may then be used to mix the desired percentage by weight of silicon Si into the metallic material M. The mixture can then be formed into a bi-polar plate (not specifically shown). When the bi-polar plates are formed through the natural melt process 100, the concentration of silicon Si may be selected to form a desired amount of silicon Si on the surface 30. More specifically, the addition of 1.5 percent by weight of silicon Si to a steel will naturally form a silicon rich surface oxide to promote the wetting of the surface 30. A contact angle of approximately 25 degrees has been measured for a steel sample with 2.5 percent by weight of silicon Si. Water contact angles A of less than 20 degrees were measured on stainless steel with 2 percent by weight of silicon Si after heating the sample at 450° C. to enrich the surface with silicon dioxide.

The incorporation of silicon S into the metallic material M used for forming the bi-polar plates 20 will increase the wettability of the surfaces 30 of the flow channels 26 of the bi-polar plates 20, and thus improve the efficiency of the flow of water and thereby improve the flow of the oxidant gas and feed gases through the flow channels 26 of the bi-polar plates 20. The improvement in the flow of the feed gas and oxidant gas through the bi-polar plates 20 in turn increases the efficiency of the fuel cell stack 12. It will be understood that any appropriate technique could be used to form the silicon rich layer on the surfaces 30 besides the techniques disclosed herein.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A bi-polar plate with improved surface wettability for a fuel cell stack, comprising:
   a body including at least approximately 70 percent by weight of a stainless steel and at least 1.5 percent by weight of titanium up to 3 percent by weight of titanium, the body defining at least one flow channel; and
   the body including greater than 4 percent by weight of silicon up to 10 percent by weight of silicon that forms a silicon dioxide surface on an outermost surface of the at least one flow channel, wherein the body is heated to about 450° C. to form the silicon dioxide surface enriched with silicon dioxide.

2. The bi-polar plate of claim 1, wherein a natural melt process is used to integrate the silicon into the stainless steel and the titanium to form the surface on the at least one flow channel.

3. The bi-polar plate of claim 1, wherein the silicon dioxide surface has a wettability contact angle of less than 40 degrees.

4. The bi-polar plate of claim 1, wherein the silicon dioxide surface has a wettability contact angle of less than 20 degrees.

5. A bi-polar plate with improved surface wettability for a fuel cell stack, comprising:
   a body including at least approximately 70 percent of a stainless steel, at least about 1.5 percent by weight of titanium to 3 percent by weight of titanium and at least about 5 percent by weight of silicon up to 10 percent by weight of silicon, the body defining at least one flow channel wherein the percent by weight of silicon is selected to form a silicon dioxide surface on an outermost surface of the at least one flow channel and to produce a wettability contact angle of less than 20 degrees on the outermost surface of the at least one flow channel and the body is heated to 450° C. to form the outermost surface enriched with silicon dioxide.

6. The bi-polar plate of claim 5, wherein a natural melt process is used to integrate the silicon into the stainless steel and the titanium to form the surface of the at least one flow channel.

7. A bi-polar plate with improved surface wettability for a fuel cell stack, comprising:
   a body portion of the bi-polar plate constructed of a stainless steel material, wherein the body portion includes 4 to 6 percent by weight of silicon and 1.5 to 3 percent by weight of titanium, the body portion having a silicon dioxide surface that defines at least one flow channel; and
   the silicon dioxide surface of the bi-polar plate integrally formed with the body portion such that the silicon dioxide surface forms an outermost surface of the body portion.

8. The bi-polar plate of claim 7, wherein the silicon dioxide surface is formed by a natural melt process.

9. The bi-polar plate of claim 8, wherein the body portion is heated to approximately 450° C. to form the silicon dioxide surface.

* * * * *